Oct. 26, 1937.　　　J. H. MARTIN　　　2,096,751
MANUFACTURE OF LENSES
Original Filed July 8, 1933　　2 Sheets-Sheet 2
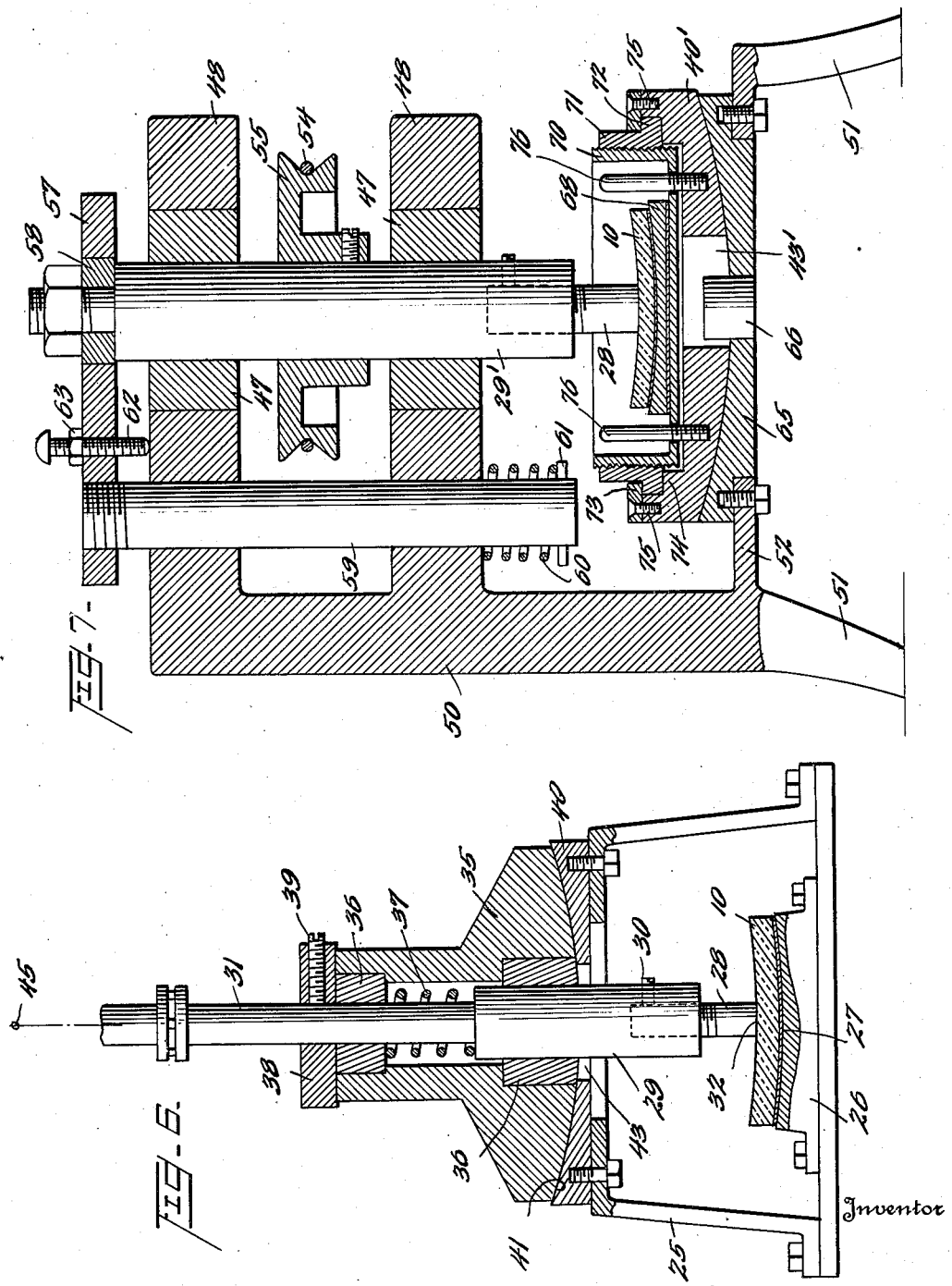

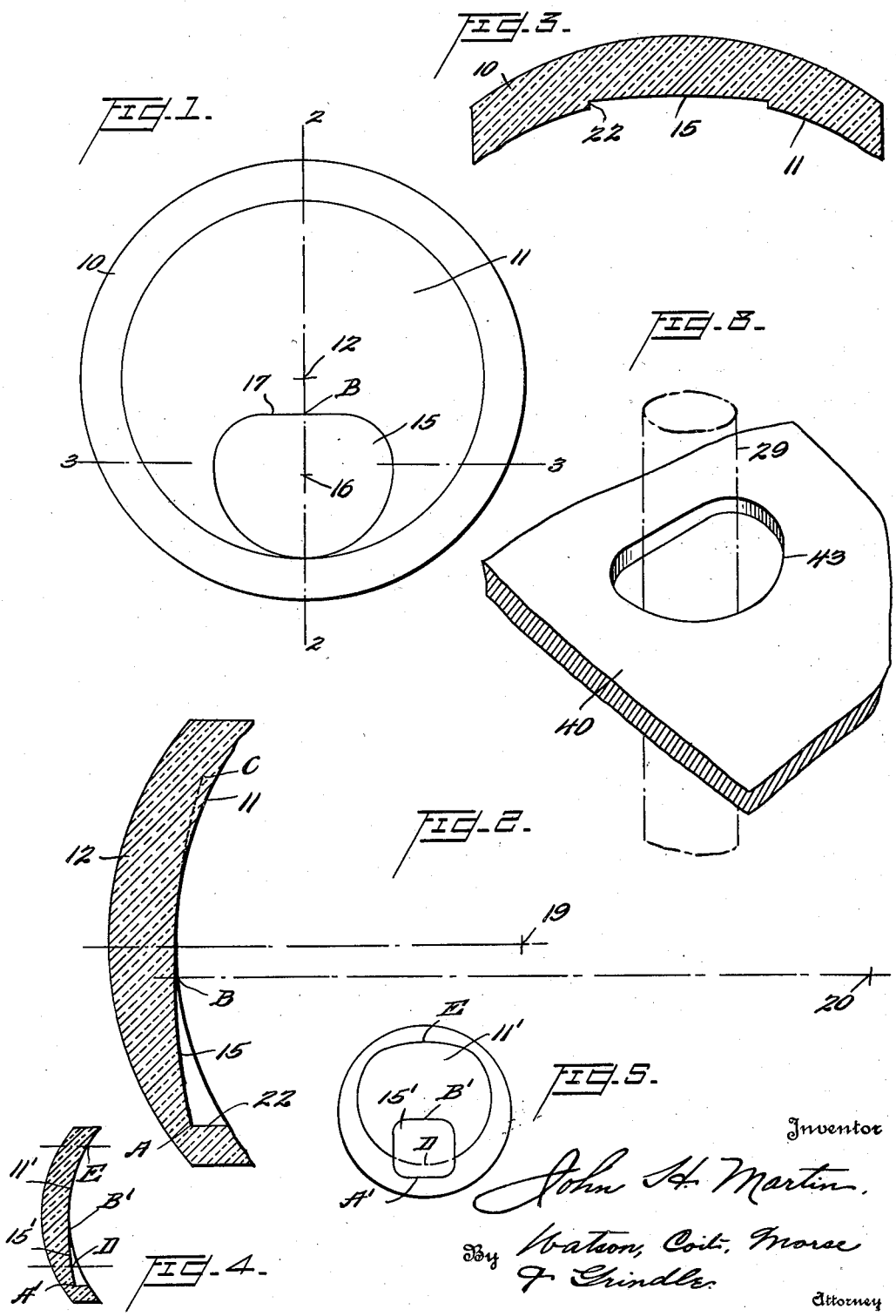

Patented Oct. 26, 1937

2,096,751

UNITED STATES PATENT OFFICE 2,096,751

MANUFACTURE OF LENSES

John H. Martin, Hartsville, S. C., assignor to Virgil Hoyt Hancock, New Orleans, La.

Application July 8, 1933, Serial No. 679,551
Renewed April 25, 1936

4 Claims. (Cl. 51—127)

This invention relates to the manufacture of ophthalmic lenses and has particular relation to means for providing an improved construction of lens of the one-piece, homogeneous, multifocal type, in contrast to the fused, welded, imbedded, or cemented types.

It is the primary object of the present invention to provide novel and improved apparatus for forming a one-piece, homogeneous multifocal lens of this type which will embody a near vision portion of more efficient design and shape for the convenience and improvement of eyesight of the wearer and which will at the same time be free of any light reflecting and vision obstructing hump or shoulder at the point of transition of the visual line from the distant into the near vision portion.

More specifically, it is an object of the present invention to provide apparatus for making this type of one-piece lens which is of simple and compact construction and which is well adapted to control the curvature of both the distant vision and near vision portions of the lens and also the outlines or boundaries of these portions.

It is generally agreed among ophthalmologists that the near vision portion of a multifocal lens must possess a flat or nearly flat top margin in order to afford a maximum of efficiency in its use to the wearer and must be as free as possible of any cause for light reflection or vision obstruction at the point of transition of the visual line from the distant into the near vision portion. Such a flat or nearly flat margin at the top permits the wearer to obtain a wide full sweep of his reading text the instant his line of vision crosses the flattened top margin of the reading portion. Heretofore such a desired flattened top margin, free of light reflecting humps or shoulders, has been possible only in the near vision portions of multifocals of the fused or imbedded type in which a plurality of glasses of different indices of refraction are employed. The treatment and preparation of the plurality of glasses forming the fused types are of necessity costly, and the high percentage of loss and defects occurring during the many operations in the course of their construction renders the fused types expensive. It is, therefore, a further object of the present invention to provide apparatus whereby the desirable flattened top margin near vision portion may be formed simply and readily from a single piece of homogeneous ophthalmic glass entirely free of any hump or shoulder causing light reflection and vision obstruction at the point of transition of the visual line from the distance into the near vision portion.

Most other multifocal lenses of one-piece construction provide a near vision portion of circular shape, and in most of these types the optical center of the near vision portion is situated some distance below the line of near vision, and often it is at a point outside of the finished lens as worn by the wearer. This condition actually creates a downward torsion on the extrinsic muscles of the eye when reading. My present invention provides for the control and positioning of the optical center of the near vision portion at any desired point ranging from the optical center of the distant vision portion of the lens to the geometrical center of the reading portion. All other efforts to produce the desired improvement in shape of the near vision portion in one-piece constructions embody first the known processes of producing a near vision portion of circular shape and then the additional treatment of such a circularly shaped near vision portion. This not only greatly increases the cost of manufacture but must of necessity produce a shoulder at the top margin of the near vision portion which varies in height from one-half to three millimeters and causes an annoying reflection of light and a dangerous obstruction of vision.

Thus, in my present invention, I have provided means for manufacturing this type of lens inexpensively from a single homogeneous blank of ophthalmic glass, as opposed to the fused type which must comprise a major lens and a circular insert set in the major lens and consisting of two segments. This apparatus includes convenient and early adjustable means for guiding and feeding the grinding and polishing tool and may be embodied in a number of different forms, certain of which are illustrated and described herein.

Other objects and features of novelty will be apparent from the following specification when read in connection with the accompanying drawings in which certain embodiments of my invention are illustrated by way of example.

In the drawings:

Figure 1 is a plan view of a completed multifocal lens as cut out from the finished blank;

Figure 2 is a vertical sectional view taken on line 2—2 of Figure 1;

Figure 3 is a horizontal sectional view taken on line 3—3 of Figure 1;

Figures 4 and 5 are views similar to Figures 2 and 1 but on a smaller scale and illustrating a modified form of lens capable of being manufactured by my novel apparatus;

Figure 6 is a vertical sectional view of one form of apparatus embodying the principles of my invention;

Figure 7 is a similar view of a modified form of apparatus comprising another embodiment of my invention; and Figure 8 is an enlarged fragmentary perspective view of the guide or template employed in the device illustrated in Figure 6, which is typical of the guiding members illustrated in the other embodiments.

Referring more particularly to Figures 1, 2, and 3 of the drawings, in which is illustrated one form of lens which my novel apparatus is adapted to produce, the reference character 10 indicates generally the ophthalmic glass lens blank. Upon the lens blank 10 there is initially ground the substantially spherical surface 11 which possesses the necessary optical characteristics of the distant vision portion of the lens. The optical center of the distant vision portion 11 is indicated at 12 and in this case coincides with the geometric center of the entire lens. The reference numeral 15 indicates a spherical surface ground upon the already formed substantially spherical surface 11 of the blank and is so designed as to produce the increased refractive power necessary to provide the near vision portion of the lens. The geometrical center of the near vision portion 15 is indicated at 16, and it will be noted that the upper margin 17 of this portion is substantially a straight line. An inspection of Figure 2 of the drawings will reveal that the two surfaces 11 and 15 merge at this line (indicated at the point B) so as to form a substantially continuous curve from the top to the bottom of the center line of the lens. Figure 2 also illustrates diagrammatically the radii of curvature of the two lens surfaces. The center of curvature of the distant portion 11 is indicated at 19 while the center of curvature of the superimposed near vision portion 15 is indicated at 20.

It will be seen that in the arrangement shown in Figure 2, the point B, which is the optical center of the near vision portion 15, is located on the line 17 which comprises the upper margin of the near vision portion. The arc ABC indicates the actual and projected curvature of the near vision portion, the two portions of the lens merging at the point B. Of course, the junction of the near and distant vision portions at the lower parts of the margin of the surface 15 is represented by a shoulder 22, as shown in Figures 2 and 3, but this will have little or no effect upon the eye since, in passing from one zone of the lens to the other, the eye naturally crosses the upper margin or boundary line 17. Thus, the line 17 may logically be called the "transition line" or "transition boundary" of the lens. At this point, as has been already explained, the lenses merge gradually without a shoulder or hump and form a continuous curve vertically and centrally of the bifocal lens. Furthermore, this conformation answers the qualification already set forth, that the transition boundary line should be a straight horizontal line.

Instead of being placed at the point B on the transition line 17, the optical center of the near vision portion may be disposed at any point between the optical center of the distant vision portion and the geometric center of the near vision portion with satisfactory visual results.

Another form of lens adapted to be produced by my apparatus is illustrated in Figures 4 and 5 of the drawings and affords the maximum efficiency in reading. It will be noted that the near vision portion 15' of the lens 10' in this embodiment is substantially square in outline and does not lie entirely within the boundary of the distant vision portion 11', the finished lens being cut from the blank as indicated by the margins of the portion 11', or in Figure 4 by the points and E. The point B' is similar in its location and optical relations to the point B in the previous embodiment.

This arrangement besides affording a wider, straight walled near vision portion, eliminates the groove or depression A' from the finished lens, leaving only very shallow depressions and shoulders along the side walls near the lower margin of the lens. Of course, the optical characteristics of the lens portions 11' and 15' may vary as in the case of the lens shown in Figures 1, 2 and 3.

In making the near vision portion of a non-circular shape in a one-piece type or multifocal lens, it is necessary to employ a grinding tool having a grinding face of smaller diameter than the surface to be ground, and in the prior art it has been possible to attach such a grinding tool to an arm swinging from a fulcrum so as to produce an oblong near vision portion. This process confines the swing of the grinding tool to a single (usually horizontal) line and makes it impossible to produce a near vision portion of a greater vertical width than the effective diameter of the grinding tool. This obstacle has been overcome by the present invention, and a non-circular near vision portion of the properties already described may be applied to an ophthalmic glass blank, as, for example, by means of the apparatus illustrated in Figures 6, 7 and 8 of the drawings.

In the embodiment of my invention illustrated in Figure 6, the ophthalmic blank is preferably stationary, although it may be adjustable to various heights for purposes of feed during the grinding operation. The rotary tool in this instance is oscillatable to secure the proper grinding effect over the desired area. A support or stand 25 is provided upon which is mounted the work holding block 26. The lens blank 10 in this case is secured to the block 26 by suitable cement, indicated at 27. The grinding tool 28 may have its shank threaded into the socket of the chuck 29 and rigidly secured in place as by means of the set screw 30. The chuck 29 is carried by the rotary spindle 31, which may be driven by a suitable motor to which it may be operatively connected by means of a universal joint.

The working face 32 of the tool 28 is of a smaller diameter than that of the surface 15 to be ground. This grinding face 32 may be of the usual materials, and for polishing the lens surface a coating of metal foil, such as tin foil or lead foil, may be affixed to the face of the grinding tool or lap. A tool of this type, when submerged in water to prevent overheating, polishes the glass more quickly and evenly and leaves a dull non-reflecting surface upon the side walls of the near vision portion.

The grinding spindle is mounted in an oscillatable manipulating member 35 by means of bearings 36. The spindle and tool are urged downwardly toward the work by means of the coil spring 37, and this movement is limited by means of the collar 38 which may be adjustably secured to the spindle 31 as by means of the set screw 39. The adjustment of this collar, as will be explained later, is for the purpose of varying the radius of curvature of the surface ground by the tool 28.

The numeral 40 designates a replaceable guide or template member, one of which may be provided for each class of lens desired. This member 40 is provided with a spherical upper surface 41 upon which the lower surface of the member 35 is adapted to rest. This lower surface of the member 35 may correspond generally in curvature to that of the surface 41. An opening 43 is provided in the template member 40 and is of a size and shape corresponding to the size and shape of the near vision portion 15 to be ground and through which the spindle or the chuck 29 is adapted to extend. In operation the member or block 35 may be oscillated in various directions, the scope of such oscillation being limited by the walls of the opening 43 so as to confine the grinding tool 28 to the area 15 or 15' to be superimposed upon the distant vision portion of the lens blank. This is more clearly shown in the enlarged view of Figure 8.

Within certain limits the radius of curvature of the surface to be ground may be varied while employing a single template 40 by adjusting the collar 38 upon the spindle 31 and thus extending or retracting the grinding tool vertically. Of course, the center of curvature of the surface to be ground and that of the surface 40 of the guide or template coincides and is located, for example, at 45, as shown in Figure 6. The collar 38 having been set for the desired radius of curvature and the lens blank having been positioned at the proper height, the rotation of the tool is started and the block 35 is oscillated, thus moving the grinding face of the tool over the surface of the lens until the whole area defined by the opening 43 in the template is ground and polished.

In the embodiment of my invention illustrated in Figure 7 of the drawings, the tool 28 is carried in a chuck 29' which is rigidly supported against lateral movement in the bearings 47 carried by the arms 48 of the support or stand 50. The stand 50 is provided with legs 51 and a shelf 52 upon which the work support is carried. The spindle or chuck 29' is arranged to be driven from a suitable source by means of a belt 54 and pulley 55. Means for feeding the tool 28 vertically toward and from the work are provided and comprise bracket 57 from which the upper end of the spindle 29' is supported by suitable bearings 58. The bracket 57 is provided with a shaft 59 which passes through the arms 48 of the stand and which is urged downwardly by means of the coiled spring 60 compressed between the arms 48 and the cotter 61 carried by the shaft 50. This arrangement is raised and lowered by means of the set screw 62 which is provided with a lock nut 63.

For the purpose of supporting and guiding the lens blank during the grinding operation, there is provided a rigid guide member 65 which is supported by the shelf 52 of the stand and is provided with a guide pin 66 which is centered accurately with respect to the grinding tool and is adapted to project into the guide opening 43' of the movable guide member 40', which in this case serves to support the blank 10. The lens blank 10 is cemented to a block 68 which is in turn suitably secured to the bottom of the cup 70 which is adjustable vertically by means of the collar 71 which is threaded around its outer surface. The collar 71 is provided with an annular flange 72 which is clamped, after suitable rotative adjustment, between the ring 73 and the upper surface of the shelf 74 formed on the guide member 40'. The ring 73 is secured by means of the set screws 75 and serves to rigidly clamp the member 71 after it has been rotated to raise or lower the cup 70 to its proper vertical adjustment. The pins 76 are threaded into the member 40' and are adapted to pass through openings in the bottom of the cup 70 in order to maintain the cup in vertical alignment with the pattern cut through the movable guide. It will be readily seen that this apparatus while generally of the same character, is practically the reverse of the one illustrated in Figure 6, the member 40' and consequently the lens block 10 being oscillated in contact with the rigidly supported rotary tool during the grinding process. It will be understood that the radius of curvature of the lens surface to be ground may be varied by the vertical adjustment of the cup 70.

A slight modification of the arrangement illustrated in Figure 7 may be made, in which the rigid guide member 65 is provided with the guide opening 43' and the pin 66 is secured to the movable member 40'.

In all of the arrangements described, the optical center of the near vision portion may be located at the desired point by varying the lateral position of the lens blank 10 upon the supporting blocks.

It will be understood that various changes and modifications may be made in the embodiments illustrated and described herein without departing from the scope of the invention as defined by the following claims.

Having thus described the invention what is claimed as new and desired to be secured by Letters Patent is:

1. In an apparatus for grinding and polishing a one-piece multifocal lens, in combination, a support, a rotary grinding tool mounted in bearings carried by said support, a guide surface member having a substantially spherical surface mounted on said support, a cooperating guide member adapted to contact with said spherical surface and provided with means cooperating with said first named guide member for defining the area over which the grinding tool may operate, and means on said movable guide member for supporting the lens to be ground.

2. Apparatus for grinding and polishing one-piece multifocal lenses, comprising, in combination, a supporting member, a holder for a lens blank carried by said supporting member, a grinding tool also carried by said supporting member and having its working end directed toward said holder, means providing for relative movement of said holder and said tool in all directions substantially transverse to their axes, and a guide member carried by said supporting member for controlling said relative movements in order to determine both the spherical curvature and the marginal outline of the surface to be ground on the lens blank.

3. Apparatus for grinding and polishing one-piece multifocal lenses, comprising, in combination, a supporting member, a holder for a lens blank carried by said supporting member, a grinding tool also carried by said supporting member and having a terminal grinding surface which is smaller in area than that of the surface to be ground and which is directed toward said holder, means providing for relative movement of said holder and said tool in all directions substantially transverse to their axes, and a template member for controlling the spherical curvature of the surface to be ground on the lens blank, said template member being provided with an endless guiding surface for controlling the marginal outline of said surface to be ground.

4. In an apparatus for grinding and polishing a one-piece multifocal lens, in combination, a support, a rotary grinding tool mounted in bearings carried by said support, a guide surface member having a substantially spherical surface rigidly mounted on said support, a cooperating movable guide member adapted to slide upon said spherical surface and provided with means cooperating with said first named guide member for defining the area over which the grinding tool may operate, means on said movable guide member for supporting the lens to be ground, and means for adjusting said last named means axially of said grinding tool.

JOHN H. MARTIN.